United States Patent Office 3,279,033
Patented Oct. 18, 1966

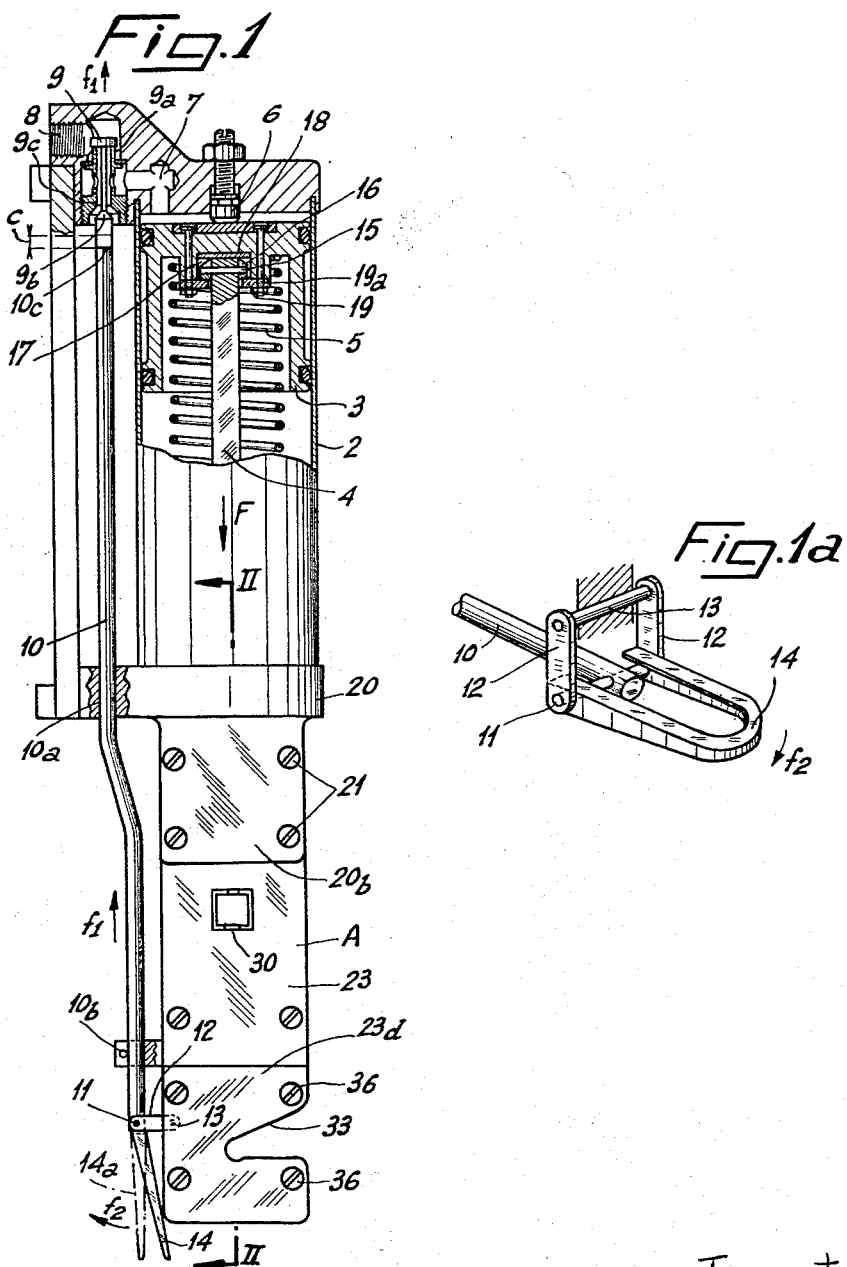

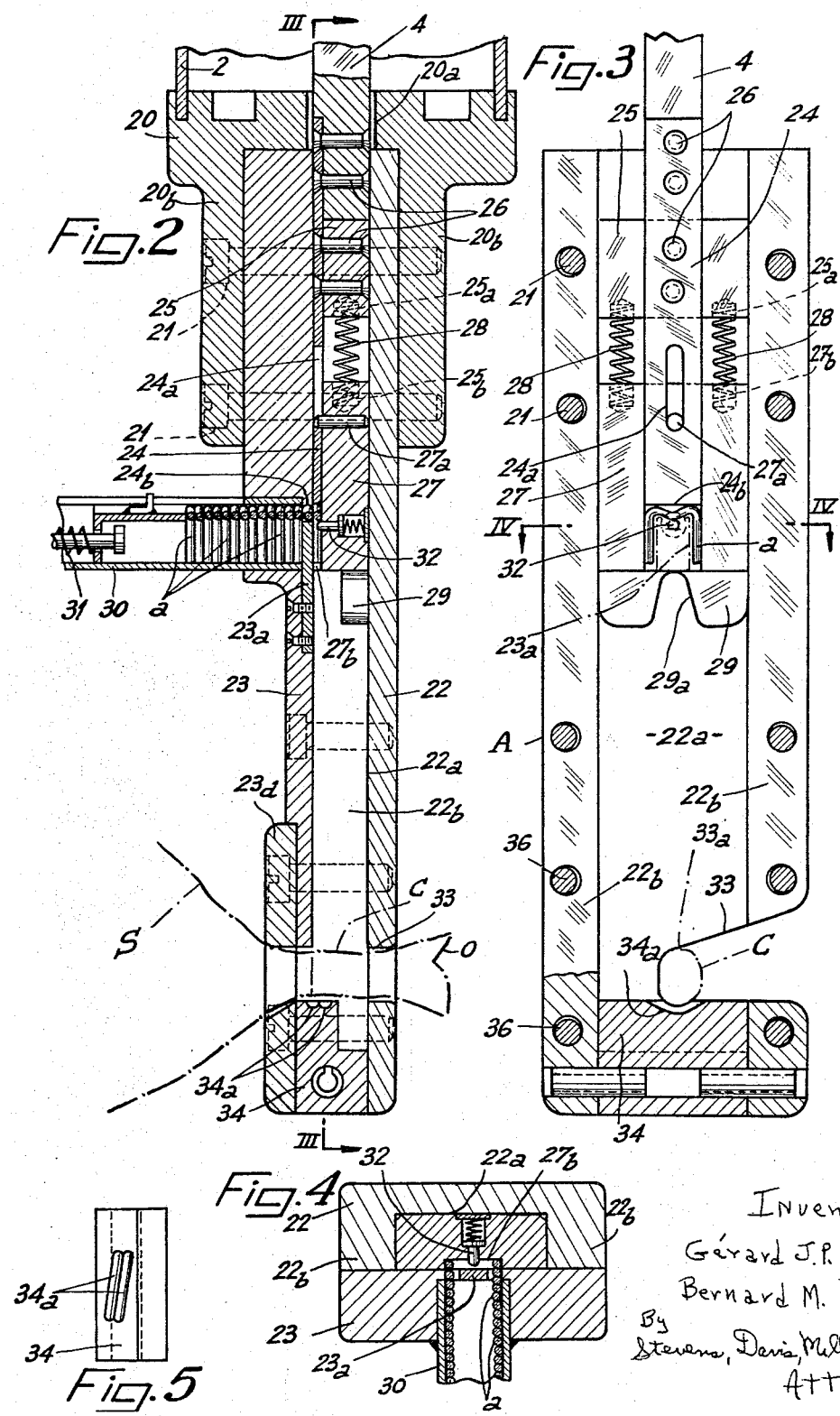

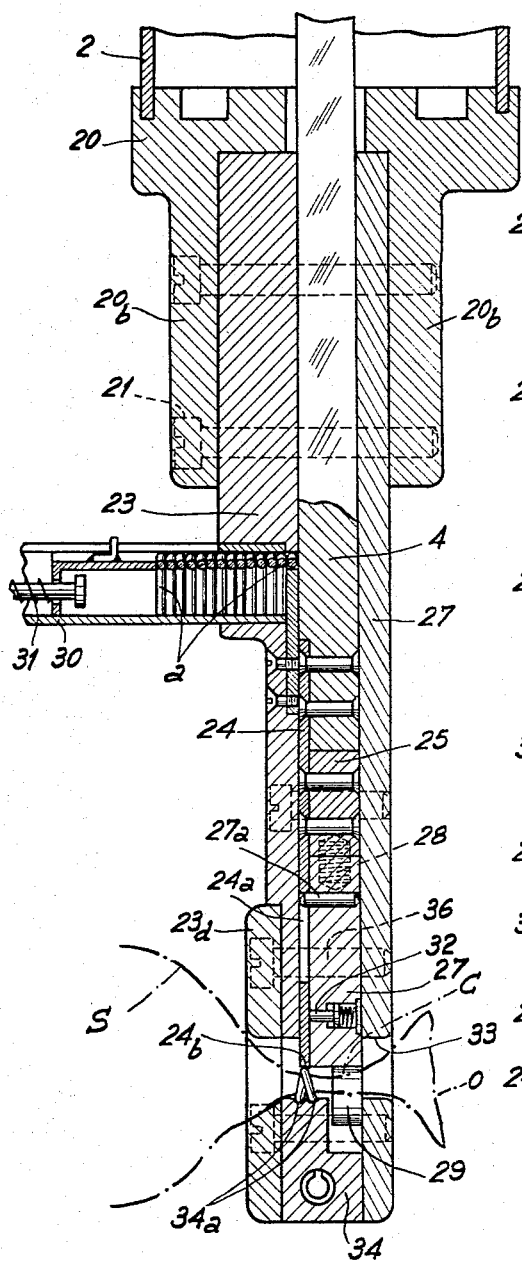
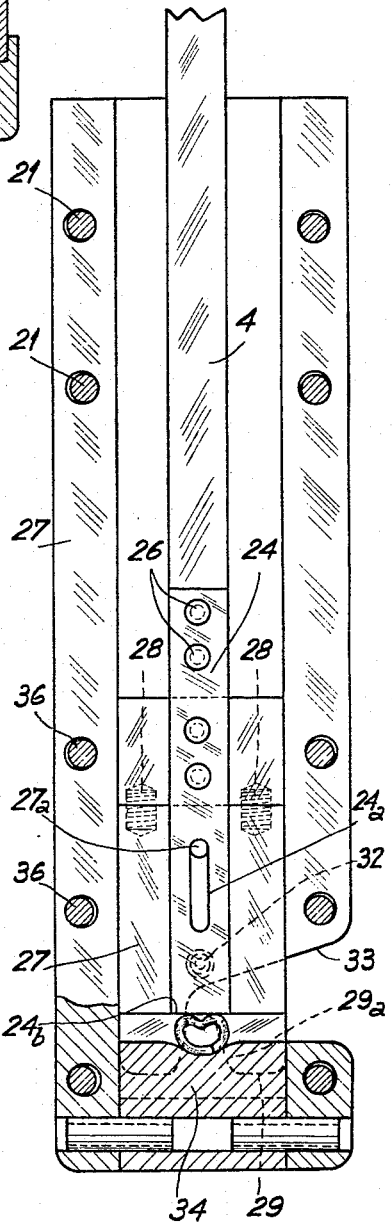
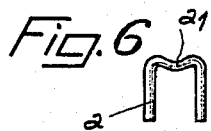

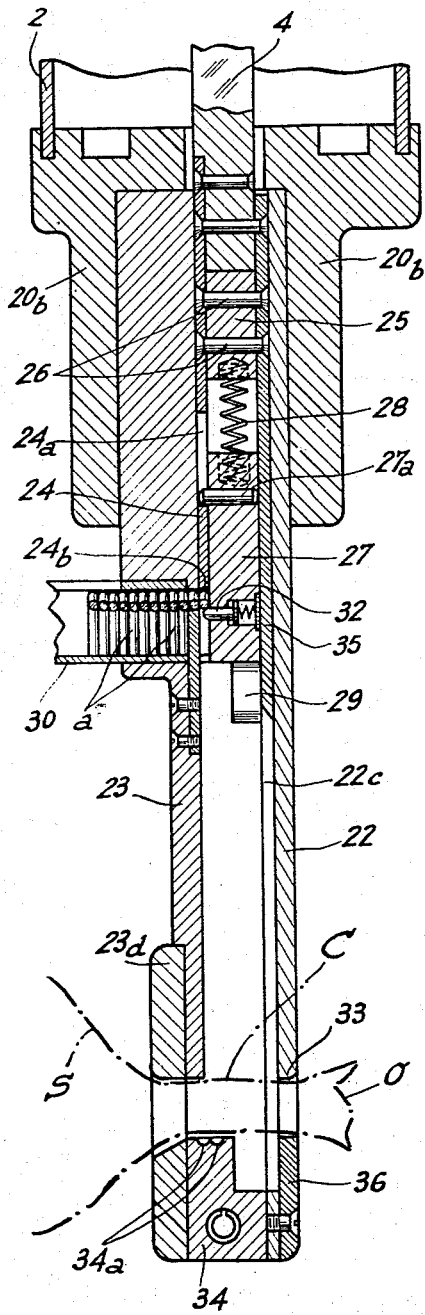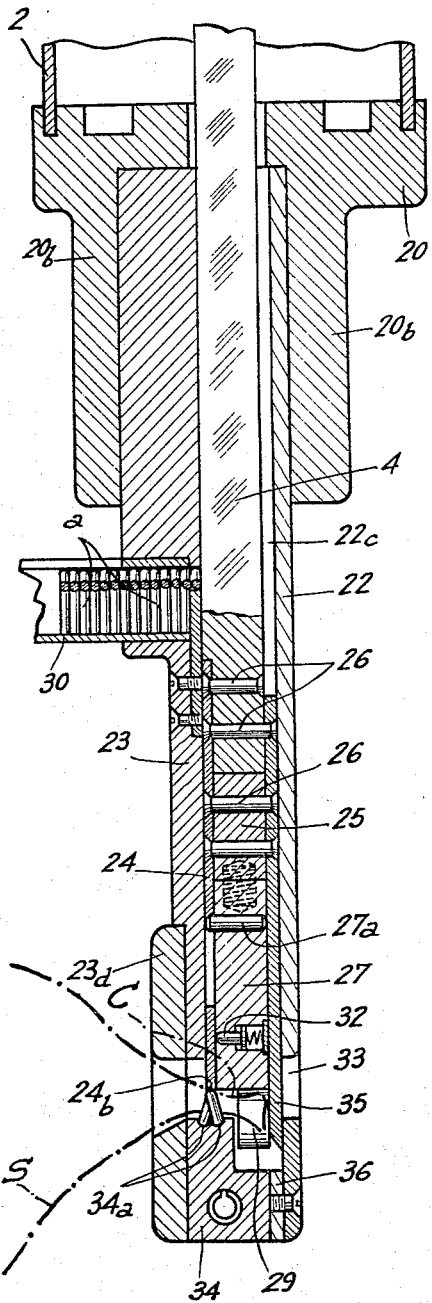

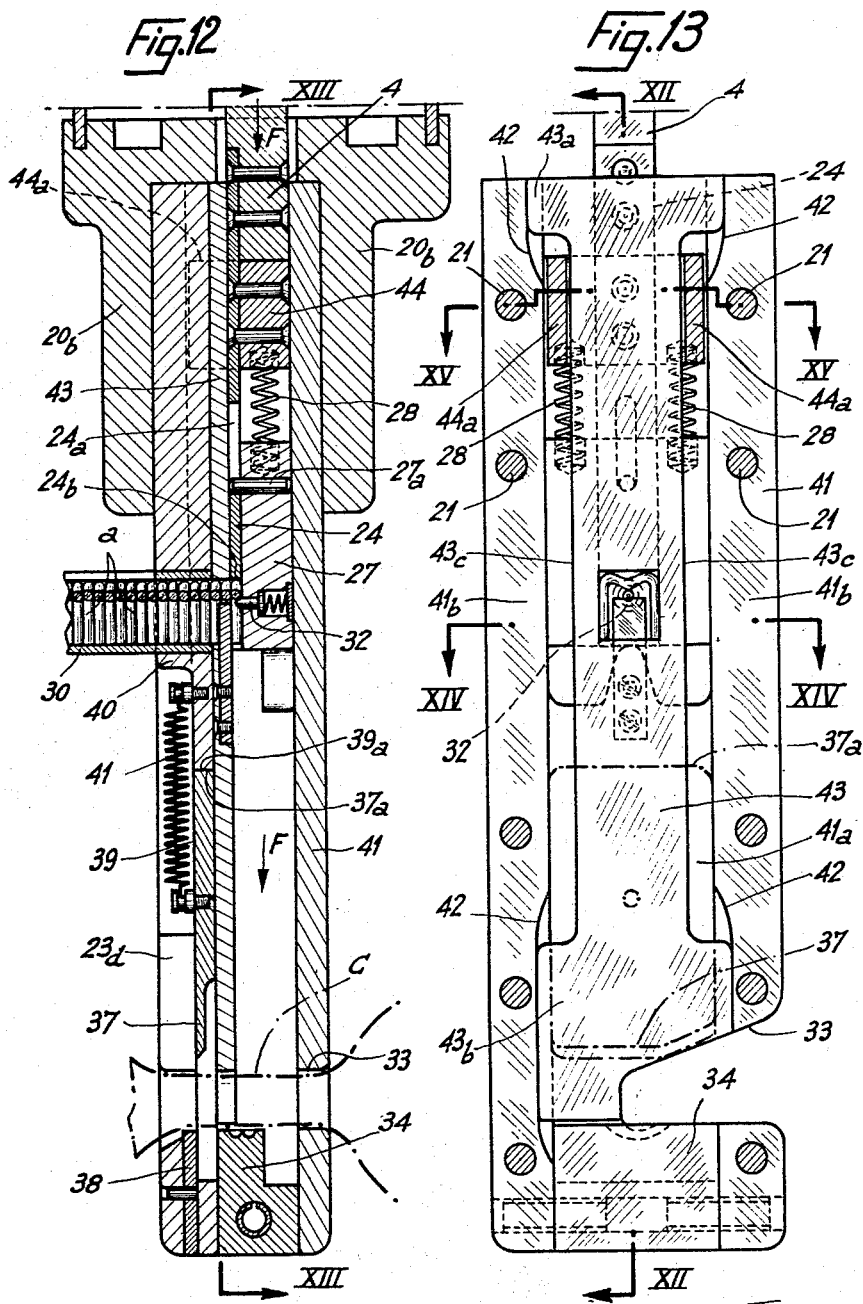

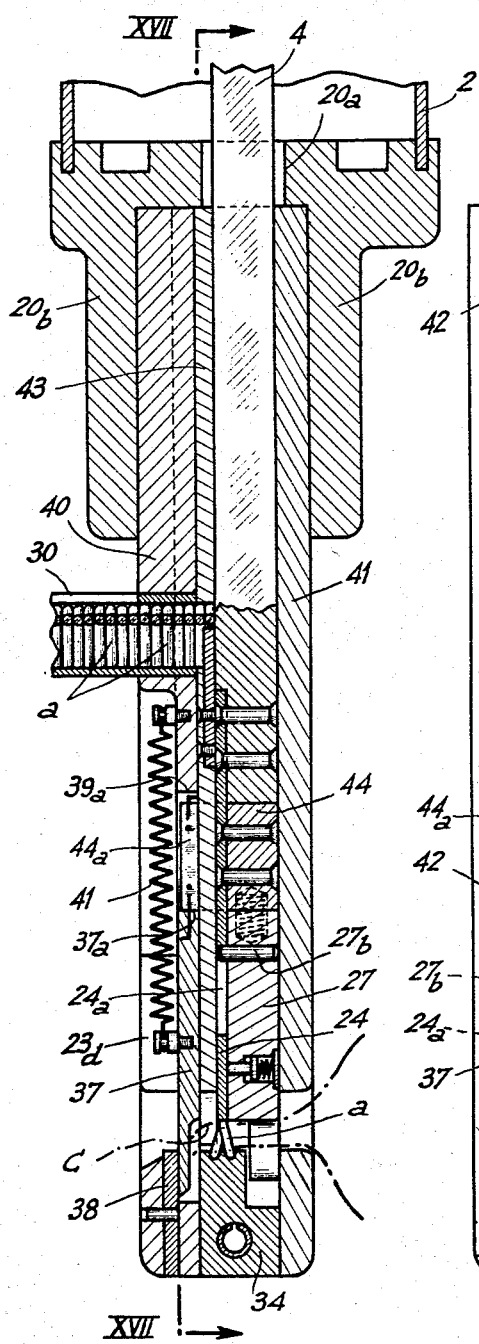
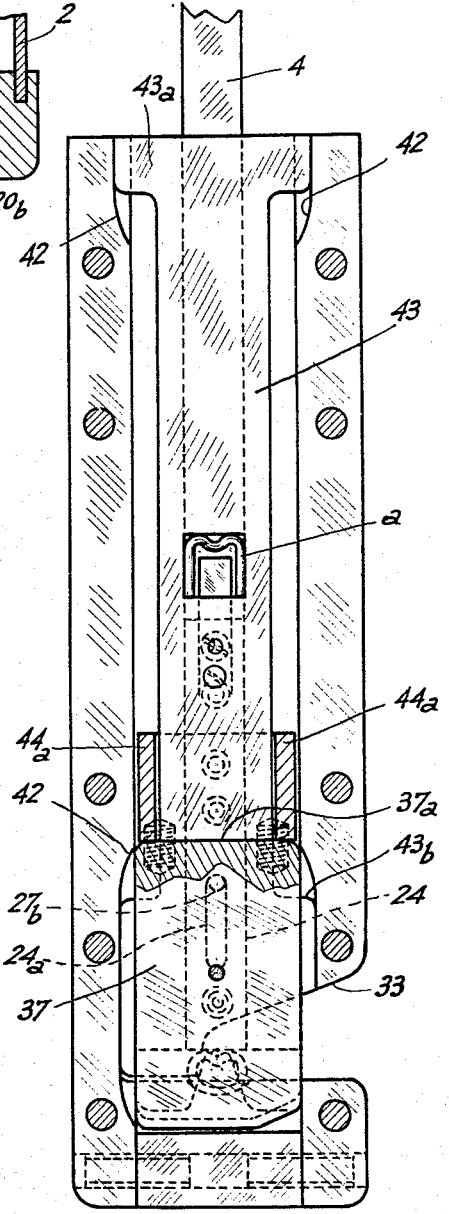

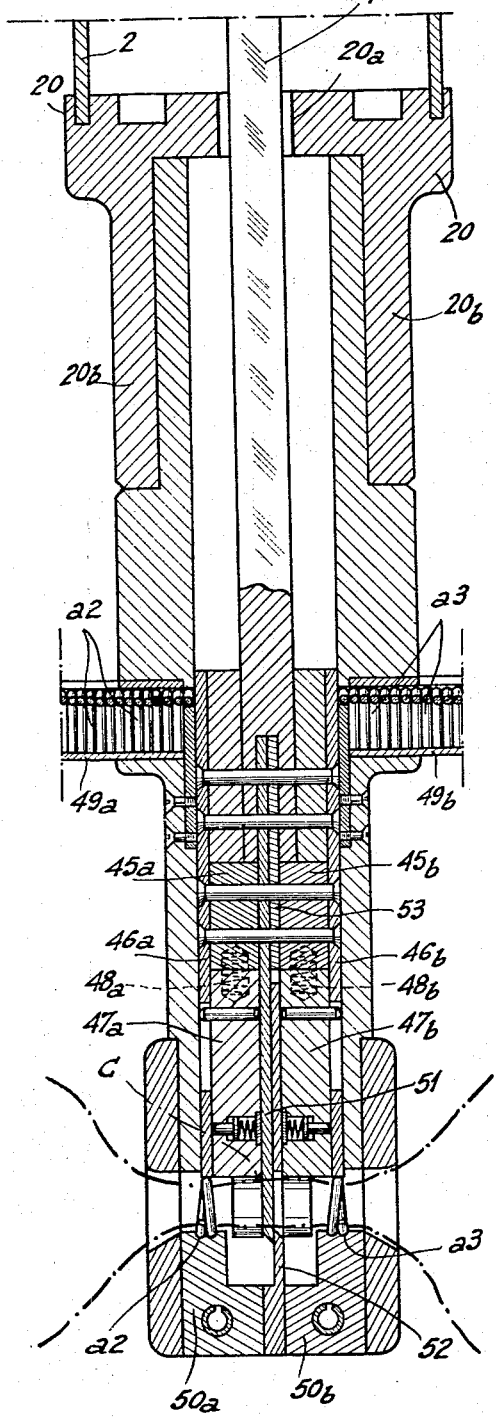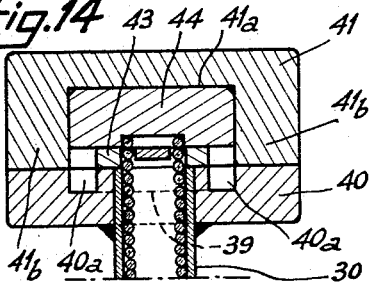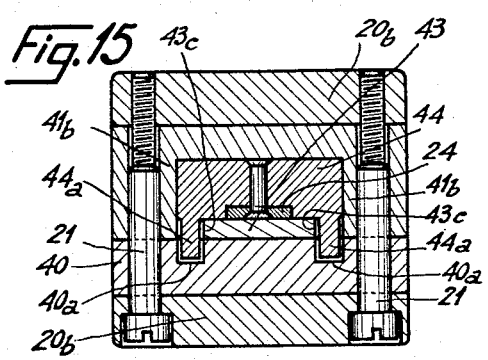

3,279,033
STAPLE APPLYING PNEUMATIC MACHINES, MORE PARTICULARLY FOR SEALING BAG-SHAPED PACKAGES
Gérard J. P. Normand, Gerardmer, Vosges, and Bernard M. Picard, Saint-Ame, Vosges, France, assignors to Societe Francaise d'Agrafage Industriel, Saint-Ame, Vosges, France, a company of France
Filed Nov. 25, 1964, Ser. No. 413,742
Claims priority, application France, Nov. 29, 1963, 955,554
18 Claims. (Cl. 29—33.5)

The present invention relates to a novel and improved type of staple applying pneumatic machines adapted, more particularly, to sealing packages such as bags or the like.

The sealing of bag-like packages, whether tightly fitted or not, is now more frequently carried out, rather than by means of ties or bindings, by using staples the branches of which are bent over mechanically around a neck or collar adjacent the opening of the bag or the like package.

Many such machines have already been proposed and/or developed for applying staples under such conditions. Certain machines as known comprise, in addition, a device for severing the collar adjacent the staple applied.

These known machines are however fairly complicated and their arrangement is generally such that is impossible, without substantial changes in parts and assembly, to adjust them for performing functions other than those for which they were established, for instance to adjust them either for simply applying a staple, or for applying a staple and severing the collar of the bag to be sealed. Moreover, in such machines, the position of the cutting or severing device relative to the path followed by the staple cannot be readily modified.

The present invention has for its object a novel type of staple applying the machine wherein, in accordance with an essential feature of the invention, the staple shaping slide-block is directly connected to the driving piston through a link-rod rigidly attached to said slide-block, on one hand, and through a flexible ball-and-socket joint, to the piston, on the other hand.

Thus, any intermediate guide arrangement may be eliminated along the path of the link-rod between the piston and the slide-block and, in particular, said link-rod may freely pass in the bottom of the cylinder, suppressing frictional wear and considerably simplifying the machining of said bottom; a further advantage of such an arrangement is the possibility of imparting the cross-section of the link-rod any desired shape.

According to other features of the invention, and by making use of standard parts and of a reduced number only of special parts, it is possible to provide either a machine for applying individual staples only, or a machine for applying a staple and causing the severing of the collar of the bag to be sealed, said bag, when presented to the machine, being placed on the side of the staple-containing holder device, or a similar machine wherein the bag is placed on the side opposite to said holder device, or, finally, a machine adapted to apply two staples spaced apart a certain distance from one another, the severing of the collar or neck of the bag to be sealed being effected between said staples.

The invention will be further illustrated by the following description of the preferred embodiments thereof, in connection with the appended drawing, in which:

FIGURE 1 is an elevational view of a machine according to the invention, with parts being broken away, the actuating mechanism thereof being represented in the rest position.

FIG. 1–a is a perspective detail view of the control system of the supply valve for the driving cylinder.

FIGURE 2 is a cross-sectional view, along line II—II of FIGURE 1, of the part of the machine termed herein "the stapling head."

FIGURE 3 is a cross-sectional view along line III—III of FIGURE 2.

FIGURE 4 is a cross-sectional horizontal view along line IV—IV of FIGURE 3.

FIGURE 5 is a detail end-view of the anvil unit adapted to assure the folding over the staples.

FIGURE 6 is a perspective view of a staple.

FIGURE 7 is a perspective view of a staple after the branches thereof were folded over through the action of the machine.

FIGURES 8 and 9 are similar views to those of FIGURES 2 and 3, showing the various parts of the stapling head, in the end position, after having applied a staple onto the bag to be sealed.

FIGURE 10 is an alternative embodiment of the machine, said stapling head comprising, in addition, a cutter means adapted to sever the article just attached, the actuating mechanism, as shown in the figure, being in the rest position.

FIGURE 11 shows the same actuating mechanism in its end position, after applying the staple and severing the article.

FIGURE 12 is a cross-sectional view along line XII—XII of FIGURE 13, representing a further alternative embodiment, with the cutter means arranged on the same side of the staple-head as the staple-containing holder device, the actuating mechanism being in the rest position.

FIGURE 13 is a cross-sectional view along line XIII—XIII, the actuating mechanism being in the rest position.

FIGURES 14 and 15 are cross-sectional views along lines XIV—XIV and XV—XV of FIGURE 13, respectively.

FIGURES 16 and 17 are similar views to those shown in FIGURES 12 and 13, respectively, showing the actuating mechanism in its end position, after fitting the staple and severing the article, FIGURE 17 being a cross-sectional view along line XVII—XVII of FIGURE 16.

FIGURE 18 is a further alternative embodiment of the staple-head, said head being arranged to simultaneously apply 2 staples and sever the article in the space between these two staples.

The stapling machine may be secured on a frame-work (not shown) or else held in one's hand by means of a handle: in this case, the actuating strap or bridge member is, obviously, carried by means of the handle.

The machine according to the invention comprises, as known in such types of machines, an engine assembly including a cylinder 2 with its piston 3, the piston rod 4 of which being connected to the slide of the staple-head A; the structure of said head will be described later in this specification.

A spring member 5 tends to maintain the piston in the rest position, as precisely defined by an adjustable stop member 6.

The cylinder 2 is connected, through conduits 7 and 8, to a compressed air source. A valve 9 is inserted between said conduits 7 and 8, the valve being maintained in its closed position, i.e. applied onto its seat 9–a, through the pressure of the air flowing through conduit 8.

By acting on valve 9 so as to move it in the direction of arrow $f_1$, until the shank 9–b of the valve will seal the annular conduit 9–c, a connection is established, through conduits 7 and 8, between the inside portion of cylinder 2 and the compressed air-source; piston 3 is urged in the direction of arrow F and will thus carry along the slide piece of staple-head A to achieve the stapling and, if necessary, the severing—in close vicinity of the staple—of the stapled article.

By discontinuing the actuation of the valve 9, the predominant force exercized by the pressure on the external face of said valve, will cause it to apply against its seat 9-a. Spring member 5 resets piston 3 to its rest position, the air comprised between the piston and the bottom of the cylinder being vented into the atmosphere through the ring-shaped conduit 9-c.

The described arrangement is well known in the art. According to a particular feature of the invention, the control of valve 9 is provided by means of a rod member 10 slidingly mounted, as shown, at points 10-a and 10-b.

Rod member 10 is connected through a pin 11 to two link-rods 12, pivoted at 13 on the casing of stapling-head A (FIGURE 1-a). These link-rods are integral with an actuating strap or trigger member 14. By depressing the strap member 14 in the direction of arrow $f_2$, rod 10 is caused to move in the direction of arrow $f_1$ and, consequently, valve 9 to open, the linking of pin 11 and rod 10 being arranged to enable the angular displacement of the first and the linear displacement of the latter.

It should be noted that the assembly—strap member 14 and link-rods 12—form together a lever of the first class, wherein the driving arms (strap 14) is comparatively long relative to the reaction arm (link-rods 12), this arrangement enabling to readily overcome the resistance due to the high pressure exercized by the compressed air on valve 9.

According to an essential feature of this invention, piston-rod 4 is not rigidly attached to piston 3, but is connected thereto by means of a resilient ball-and-socket joint, such as shown in FIGURE 1, wherein on said rod 4 is secured, by pin 15, a head piece 16 accommodated in a blind recess 17 of piston 3; said head piece 16, abutting against a slightly resilient washer 18, is maintained in position in said recess by means of a ring 19 attached to piston through bolts 19-a.

This arrangement, which may be substituted by any other non-rigid, equivalent, arrangement, eliminates the requirement of an accurate double-guide system between the passageway of the stapling-head A and cylinder 2 by way of the sliding-block, the piston-rod and the piston.

Consequently, piston-rod 4 may be formed with any desirable cross-section, so as to avoid, in particular, any possible buckling; such a cross-section may, for instance, be non circular, and have a square profile, greatly facilitating its attachment with the slider of stapling-head A. In this case, the passage 20-a formed in bottom 20 of cylinder 2 placed against head A may be circular and have a diameter equal to the diagonal of the square corresponding to the cross-section of piston-rod 4; such an arrangement, while not assuring an absolute guidance of said rod 4, is however sufficient for a reliable operation of the machine.

The stapling-head A has the general shape of a rectangular parallelipiped. The head is attached to bottom 20 of cylinder 2 by means of two lugs 20-b integral with said bottom, inserted therebetween and maintained in position by means of screws such as 21.

According to the invention, head assembly A comprises a casing 22 closed by a lid 23 (as seen more clearly in FIGURES 2, 3 and 4). Casing 22 is of a U-shaped section forming a longitudinal cavity 22-a limited on each side by the internal faces of wings 22-b, the height of said faces being equal to the side of the square section of rod 4.

At its end opposite to that attached to piston 3, piston-rod 4 is connected to the slide of head assembly A, which slide includes a blade member 24 for driving the staples and a head piece 25 for guiding said slide in cavity 22-a, the connection being effected by means of rivets 26.

In continuation of and in alignment with head piece 25 there is a carriage 27 having a pin 27-a engaging an oblong slot or stud-hole 24-a of blade 24. Compression springs 28 partly engaging recesses 25-a and 27-b of head piece 25 and carriage 27, respectively, are adapted to maintain the latter in position, through the abutment formed on pin 27-a, at the end of stud-hole 24-a.

Carriage 27 has, on one hand, an extension 29 cut out in such a manner as to form a fork-shaped member and, on the other hand, is formed with a slot 27-b wherein blade 24 is slidingly mounted.

To lid 23 is attached a container 30 forming, as usual, the feeder wherein is accommodated a strip of staples $a$ urged by a spring 31.

Staples $a$ are shaped as shown in FIGURE 6, presenting a general U-profile the central limb of which is curved in $a_1$.

The first staple to be driven is maintained in position, frontwise, on one side, by bearing against the bottom of recess 27-b and, on the other side, by the succeeding staple in the strip of staples, urged by spring 31 (FIGURE 2); sidewise, by the parallel faces of the recess 27-b; and vertically, between the end 24-b of blade 24 and a spring-controlled plunger 32 carried by carriage 27 (FIGURES 2, 3, 4).

A plate 23-a integral with lid 23 has a width equal to the gap between the branches of the staples, as shown by dot-and-dashed line in FIGURE 3. This plate, which cooperates in maintaining the staples in position, has, in addition, a function which will be indicated in the following.

Head assembly A is cut out, in the vicinity of its lower portion, to form a guide 33 for bringing the article to be stapled—for instance a bag S ending in a collar C—in the correct position for receiving the staple.

To this purpose, the end portion 33-a of the guide is arranged in coaxial relationship with the median axis of blade 24 and, consequently, of staple $a$ (FIGURE 3).

At its lower end, head assembly A comprises an anvil unit 34 detachably mounted, at the end of recess 22-a of casing 22, between the bottom of said recess and a plate 23-d secured to lid 33 by means of screws 36 attaching the latter to casing 22 (FIGURES 1, 2, 3).

The anvil unit 34 comprises, as known in stapling devices, two grooves 34-a arranged side by side, as shown, more particularly, in FIGURE 5, with the object of causing the branches of the staple to overalp after the closure thereof, the staples then assuming the shape shown in FIGURE 7.

The operation of the machine just described is as follows:

The machine being in the rest position, such as shown in FIGURES 1, 2, 3, the article to be stapled, for instance the collar or neck C of a bag S, is inserted in guide 33 up to the end thereof, as shown in FIGURES 2 and 3, bag S being arranged, at will, either on the side of the feeder, as illustrated in FIGURE 2, or on the side opposite said feeder.

The strap or trigger member 14 is then actuated in the direction of arrow $f_2$ to bring it in the position indicated in 14-a; under these conditions, the end portion 10-c of the rod moves along a path c (FIGURE 1), valve 9 is removed from its seat, while its shank 9-b seals the ring-shaped conduit 9-c and pressure is admitted on the front face of the piston, which is thus moved along arrow F.

Piston-rod 4 will then carry along, in the same direction F, plate 24 and head piece 25 and, through springs 28, the carriage 27.

Plate 24 separates from the staple-strip the staple located in recess 27-b; said staple, which is abutting against the end of stop plunger 32 and slides against the inner face of the previously mentioned plate 23-a, is thus firmly held at the place where the container 30 opens into head assembly A, and, beyond said place the staple continues to be firmly maintained by bearing against the inner face of lid 23.

Towards the end of the path, in the direction of arrow F, the cut-out portion of extension 29 of carriage 27 encloses collar C and ultimately the end portion of carriage 27 will bear against said collar. At this instant, springs 28, on being compressed, allow the carriage to remain applied against the collar so as to hold the same, without however overcrushing the same while plate 24 continues its travel to apply and clamp the staple against the anvil unit 34 (FIGURES 8 and 9), thus assuring the closure of the staple by imparting the same the shape shown in FIGURE 7.

At the beginning of the relative movement of plate 24 with respect to the carriage 27 maintained in the rest position, the stop plunger 32 retracts into its recess to disengage the staple (FIGURE 8).

When the stapling operation is finished, the depressing of the actuating strap member 14 is discontinued, the piston urged by spring 5 is restored to its rest position carrying along, through piston-rod 4, blade 24 and head piece 25, springs 28 expand and finally carriage 27 is carried along by plate 24 on account of the end of stud-hole 24–a meeting pin 27–a.

The mechanism of head assembly A is then brought from the position as shown in FIGURES 8 and 9 to that illustrated in FIGURES 2 and 3, and a new cycle may then be started. The machine described is adapted to apply a staple, for instance to seal a bag S adjacent the edge of its opening O. According to an alternative embodiment, as shown in FIGURES 10 and 11, the staple applying machine is adapted to sever the article to be sealed adjacent the place where the staple has been fitted.

In these figures, the same elements are provided as those mentioned in FIGURES 2 to 5, namely: piston-rod 4, head piece 25, carriage 27, springs 28, anvil unit 34, these elements being all inserted in casing 22 closed by lid 23 carrying the contained 30.

According to this alternative embodiment, to these elements are added, on one hand, a cutter blade 35 secured to piston-rod 4 and to head piece 25 by means of rivets 26, as previously mentioned, and, on the other hand, a fixed knife 36 connected to casing 22, blade 35 being slidingly mounted in a guiding recess 22–c, milled in the bottom of casing 22.

The operation of such a machine is readily understood, in connection with the previously described arrangement and reference being made to FIGURE 10 wherein the elements illustrated are shown in the rest position, and to FIGURE 11 wherein said elements are in the operative end position, i.e. after the staple $a$ has been applied on collar C of a bag S and after severing said collar through the action of blade 35 and knife 36, at a point between the staple and edge O of the bag.

It should be noted that before severing of the collar, the latter is effectively held rolled about through the action of carriage 27, as if it be maintained by hand, during the whole period of stapling and cutting of the article.

With the machine just described, the cutting of the article to be sealed is achieved on the side of head assembly A, as opposed to that carrying the container 30. In certain cases, it may be necessary—for instance for dimensional requirements—that the article to be stapled be presented to the machine in the position illustrated in FIGURE 12, the cutting operation being effected on collar C beyond the staple, on the side of container 30.

According to an alternative embodiment in view of achieving this object, as shown in FIGURES 12 to 17, the same elements as described with reference to FIGURES 2 to 5 are indicated, viz.: piston-rod 4, blade 24, a head similar to head piece 25, the carriage 27, springs 28, anvil unit 34, container 30, a casing and a lid.

This arrangement is completed, according to this alternative embodiment, by a mobile knife 37 and by a stationary knife 38.

The stationary knife 38 is removably attached to plate 23–d and the mobile knife 37 is slidingly mounted in a slide 39 formed on lid 40 (corresponding to the previously mentioned lid 23). A spring 41 maintains in the rest position the edge 37–a of knife 37 by urging it against the end 39–a of said slide 39.

Casing 41 replaces the previously described casing 22 and comprises, adjacent its ends, recesses such as 42 adapted to maintain the enlarged portions 43–a, 43–b of a plate 43 the edges 43–c of which are parallel and spaced a certain distance apart from the wings 41–b of the cavity 41–a of casing 41 (corresponding, obviously, to cavity or recess 22–a of casing 22).

Head piece 44, replacing head piece 25 as previously described, comprises two side lugs 44–a (FIGURES 13 and 15) each engaging, on one hand, the empty space between edge 43–c of plate 43 and the corresponding edge of wings 41–b of the casing and, on the other hand, the recess 40–a formed in lid 40. The external edges of recesses 40–a constitute the edges of slide 39 previously mentioned, wherein is slidingly mounted knife 37.

The operation of the machine just described is as follows:

When piston 3 drives piston-rod 4 in the direction of arrow F, plate 24 and carriage 27 will be moved in this same direction and operate as previously stated.

Head piece 44 equally moves together with piston-rod 4 and its lugs 44–a engage edge 37–a of knife 37 and drive the latter in the direction of arrow F to bring it in the end position (FIGURES 16 and 17), after having severed collar or neck portion C of the article sealed, beyond staple $a$ fastened on said collar.

Upon piston 3 being restored to its rest position, lugs 44–a of head piece 44 disengage knife 37 which, under the action of spring 41, is restored to its rest position by abutting against bottom 39–a (FIGURE 12). The other elements are also brought back to their rest position, as previously described.

According to still another alternative embodiment, the machine is arranged in such a manner as to apply two staples $a_2$, $a_3$ on collar C (FIGURE 18) and cause this collar to be severed in the interval comprised between said two staples.

To this end, piston-rod 4 carries to identical head pieces 45–a, 45–b; two blades 46–a, 46–b, two carriages 47–a, 47–b with their cooperating sets of springs 48–a, 48–b.

The head comprises two containers 49–a, 49–b for staples $a_2$ and $a_3$, respectively, and two anvil units 50–a, 50–b.

Between these two sets of members, which are arranged in symmetrical relationship relative to the median axis of the head, is inserted a cutter blade 51 integral with piston-rod 4 and adapted to cooperate with a stationary knife 52. A backplate 53 of equal thickness to that of the blade 51 enables to achieve the symmetry of the assembly.

FIGURE 18 shows the various elements in the end position after applying the staples and severing collar C. It will be understod that when the piston is restored to its rest position, the whole mobile assembly will move in the same way as the previously described mobile assemblies.

While the invention has been described in detail with respect to certain now preferred examples and embodiments, it will be understood by those skilled in the art that various changes and modifications may be made without departing from the spirit and scope of the invention, and it is intended, therefore, to cover all such changes and modifications in the appended claims.

What we claim is:

1. A machine for applying staples, more particularly for sealing bag-shaped packages, comprising essentially: a framework having a guideway ending in an anvil-forming piece and formed with an opening through which the staples to be applied are inserted; a carriage slidingly mounted in said guideway, between a first position wherein it faces said opening and a second position wherein it is adjacent said anvil, said carriage being formed with an elongated recess of a width equal to that of a staple and placed opposite said opening when said carriage occupies said first position; a slide-block mounted in the guideway and comprising a staple-pushing blade member slidingly mounted in said recess and resilient means between said slide-block and said carriage for normally maintaining said two members spaced apart and for returning said blade member beyond the opening for the passage of the staples when said carriage occupies said first position.

2. A machine according to claim 1, wherein said slide-block is attached to a driving piston mounted on the framework by means of a rod connected, through a ball-and-socket joint, to said piston.

3. A machine according to claim 2 wherein said resilient ball-and-socket joint consists of a head piece secured to the end of the piston-rod and engaging a blind recess formed in said piston, said recess being closed by a washer causing said head to abut against a resilient washer located on the bottom of said recess.

4. A machine according to claim 3, wherein said piston-rod is formed with a square cross-section and passes through the bottom of the cylinder by way of a circular cross-sectional hole of a diameter equal to the diagonal of the square cross-section of said rod.

5. A machine according to claim 1 wherein said slide-block is actuated by an air-compressed driving cylinder fitted with a control strap or trigger for the opening of the inlet valve of compressed air into said driving cylinder, and having the form of a lever of the first class connected to a sliding rod acting by thrust on said valve.

6. A machine according to claim 2 wherein said sliding-block and the staple-pushing blade member are rigidly attached to the piston-rod.

7. A machine according to claim 1, wherein the guideway is provided by a casing having a U-shaped cross-section, equipped with a lid, said casing and said lid being directly connected to said driving cylinder.

8. A machine according to claim 1 wherein a stop pin engaging a stud-hole of the blade of the slide-block defines the limit between said slide-block and said carriage.

9. A machine according to claim 1, wherein a stop plunger is resiliently mounted in the mobile carriage so as to cooperate in holding the staple in the recess adapted to receive the same.

10. A machine according to claim 1, wherein the staple-forming anvil unit is removable.

11. A machine according to claim 1 wherein, adjacent said anvil, the passageway is cut out to form a guideway for the collar or neck of the bag to be sealed.

12. A machine according to claim 11 wherein the end portion of the movable carriage is formed as a fork in order to resiliently maintain said collar or neck in the guideway during the shaping of the staple.

13. A machine according to claim 1 wherein the stapling machine is provided with a cutting blade.

14. A machine according to claim 13 wherein said blade is rigidly attached to the slide and is slidingly mounted in a recess provided to this end and formed in the bottom of the passageway.

15. A machine according to claim 1 wherein a cutter blade is slidingly mounted in a recess formed in the lid of said passageway, a return spring tending to maintain that blade against the end of said recess.

16. A machine according to claim 15 wherein said slide comprises two side lugs the upper ends of which engage the recesses of the lid in such a manner that, when the slide moves, said lugs will engage said cutter blade in order to move it against the power of said return spring.

17. A machine according to claim 16, wherein a plate inserted between said slide and said lid assures, on one hand, the maintaining in position of the cutter blade in the lid recess and, on the other hand, forms the bearing surface against which is slidingly moving the stapled driven by said slide blade.

18. A machine according to claim 1, wherein the passageway contains two slide-blocks attached rigidly to one another, each one of said slide-blocks comprising a staple-pushing blade and a mobile carriage carrying an abutment plunger; between said slide-blocks there is provided a cutter blade, said passageway comprising, for each slide-block, an opening for the insertion of the staples, the machine thus assuring the simultaneous application of two staples on the collar or neck of a bag to be sealed and the cutting off of the collar in the gap between said two staples.

References Cited by the Examiner

UNITED STATES PATENTS 3,237,290   3/1966   Frank _____ 29—33.5

RICHARD H. EANES, JR., *Primary Examiner.*